(12) United States Patent
Tsai (10) Patent No.: US 10,978,973 B2
(45) Date of Patent: Apr. 13, 2021

(54) MOTOR DRIVING CIRCUIT AND METHOD THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/749,782

(22) Filed: Jan. 22, 2020

(65) Prior Publication Data

US 2021/0067068 A1 Mar. 4, 2021

(30) Foreign Application Priority Data

Aug. 30, 2019 (TW) .................................. 108131182

(51) Int. Cl.
*H02P 23/12* (2006.01)
*H02P 6/15* (2016.01)
*H02P 6/28* (2016.01)

(52) U.S. Cl.
CPC ................ *H02P 6/153* (2016.02); *H02P 6/28* (2016.02)

(58) Field of Classification Search
CPC .................................... H02P 6/153; H02P 6/28
USPC ................................................... 318/400.14
See application file for complete search history.

(56) References Cited

U.S. PATENT DOCUMENTS

| | | | | |
|---|---|---|---|---|
| 2002/0114230 A1* | 8/2002 | Kadlec | ................. | G11B 7/0945 369/44.29 |
| 2006/0138994 A1* | 6/2006 | Cheng | ..................... | H02P 21/34 318/807 |
| 2010/0309693 A1* | 12/2010 | Hu | ..................... | H02M 7/53875 363/41 |
| 2014/0043076 A1* | 2/2014 | Hesener | ............... | H03K 5/1565 327/170 |
| 2015/0256111 A1* | 9/2015 | Forster | ..................... | H02P 6/15 318/400.22 |

* cited by examiner

*Primary Examiner* — Erick D Glass
(74) *Attorney, Agent, or Firm* — Li & Cai Intellectual Property (USA) Office (57) ABSTRACT

A motor driving circuit for driving a motor is provided. The motor driving circuit includes a plurality of inverter circuits, a driving signal look-up table module, a driving signal generating unit, a duty cycle command detector, and a protection control circuit. The driving signal look-up table module performs a table lookup on an input driving signal to generate a driving waveform pattern signal while outputting a positive period indication signal. The duty cycle command detector generates a first protection start signal when a duty cycle corresponding to the input driving signal changes by more than a predetermined amount of change. The protection control circuit outputs a forced disable signal in a positive period interval in response to receiving the first protection start signal to control the lower bridge switch of one phase of the inverter circuits to be turned off.

12 Claims, 6 Drawing Sheets

MOTOR DRIVING CIRCUIT AND METHOD THEREOF

CROSS-REFERENCE TO RELATED PATENT APPLICATION

This application claims the benefit of priority to Taiwan Patent Application No. 108131182, filed on Aug. 30, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving circuit and method, and more particularly to a motor driving circuit and method capable of preventing a reverse current from being generated when an output cycle changes rapidly.

BACKGROUND OF THE DISCLOSURE

In a motor such as a brushless direct current (DC) motor that does not have a commutation mechanism formed by electrical brushes, it is necessary to switch a direction of current supplied to a coil in accordance with a position of a rotor. In general, there are two driving methods of the brushless DC motor, one manner is using information of the rotor obtained from Hall elements to estimate a position of the rotor, and another manner is a sensorless manner of estimating the position of the rotor according to a zero-crossing point of a back electromotive force (BEMF), which is an inducted voltage generated in the coil without using Hall elements.

The existing DC motor driving methods can be divided into a six-step square wave driving method and a sine wave pulse width modulation (PWM) method, and the two different driving methods have advantages and disadvantages. The sine PWM driving method is similar to a method for driving an AC motor, which inputs a three-phase sinusoidal current at a stator end, and generates a set of rotating magnetic fields to drive the rotor to rotate. Smaller torque ripples can be obtained by using the sine wave PWM driving method to drive the brushless DC motor; however, a position sensor having a higher resolution is required to generate a correct sine wave signal. The six-step square wave driving method has low switching loss and does not require precise rotor position feedback, but torque ripples thereof can be larger.

Secondly, when controlling a rotation speed of the motor, the pulse width modulation technology is primarily used, that is, PWM signals are generated to control transistor switches, and a duty cycle of the PWM signals is directly proportional to an average voltage given to the motor, so that the rotation speed of the motor can be controlled. The PWM signal controls transistor switch in many different ways, such as controlling an upper bridge transistor switch and a lower bridge transistor switch simultaneously or in turns.

However, when a speed of the motor is controlled to be dropped, a back electromotive force generated by the motor in a high-speed operating state caused by an inertia will generate a reverse current. The generated reverse current will flow back to a power supply terminal in a positive period while the lower bridge transistor switch is turned off, thereby causing a level of a voltage source potential to be raised, and the components to be damaged.

Therefore, there is an urgent need for a motor driving circuit and method that can prevent a reverse current from being generated when an output cycle changes rapidly.

SUMMARY OF THE DISCLOSURE

In response to the above-referenced technical inadequacies, the present disclosure provides a motor driving circuit and method capable of preventing a reverse current from being generated when an output cycle changes rapidly.

In one aspect, the present disclosure provides a motor driving circuit for driving a motor, and the motor driving circuit includes a plurality of inverter circuits, a driving signal look-up table module, a driving signal generating unit, a duty cycle command detector, and a protection control circuit. The plurality of inverter circuits are respectively connected to a plurality of phase circuits of the motor, and each including an upper bridge switch and a lower bridge switch. The driving signal look-up table module is configured to perform a table lookup on an input driving signal to generate a driving waveform pattern signal and simultaneously output a positive period indication signal for indicating a positive period interval of the input driving signal. The driving signal generating unit is configured to generate a pulse-modulated control pulse signal for each phase in response to the driving waveform pattern signal to control ON and OFF states of the inverter circuits. The duty cycle command detector is configured to generate a first protection start signal when a duty cycle corresponding to the input driving signal changes by more than a predetermined amount of change. The protection control circuit is configured to receive the positive period indication signal, and output a forced disable signal in a positive period interval in response to receiving the first protection start signal to control the lower bridge switch of one phase of the inverter circuits to be turned off.

In certain embodiments, the motor driving circuit further includes a reverse current detecting circuit disposed between the inverter circuits and the phase circuits of the motor, and configured to output a second protection start signal when detecting a reverse current. The protection control circuit is further configured to output the forced disable signal in the positive period interval in response to receiving the second protection start signal to control the lower bridge switch of one phase of the inverter circuits to be turned off.

In certain embodiments, the reverse current detecting circuit further includes a first comparator configured to compare the reverse current with a reference current, and output the second protection start signal in response to the reverse current being larger than the reference current.

In certain embodiments, the protection control circuit includes a counter configured to start timing when the forced disable signal is generated, and stop outputting the forced disable signal after a predetermined time.

In certain embodiments, the driving signal generating unit includes a sinusoidal wave modulator, a triangular wave generator, and a second comparator. The sinusoidal wave modulator is configured to receive the driving waveform pattern signal to generate a sinusoidal wave modulation signal, the triangular wave generator is configured to generate a triangular wave signal, and the second comparator is configured to receive the sinusoidal wave modulation signal and the triangular wave signal and perform a comparison operation to generate the control pulse signal.

In certain embodiments, the driving signal generating unit further includes a switching circuit and a square wave driving circuit, the switching circuit is configured to switch an output of the driving signal generating unit from an output of the second comparator to the square wave driving circuit when receiving the first protection signal, and the square wave driving circuit generates a plurality of square wave driving signals corresponding to the phase circuits of the motor according to the input driving signal to control ON and OFF states of the phase circuits.

In one aspect, the present disclosure provides a motor driving method including the following steps: configuring a driving signal look-up table module to perform a table lookup on an input driving signal to generate a driving waveform pattern signal and simultaneously output a positive period indication signal for indicating a positive period interval of the input driving signal; configuring a driving signal generating unit to generate a pulse-modulated control pulse signal for each phase in response to the driving waveform pattern signal to control ON and OFF states of a plurality of inverter circuits, in which the plurality of inverter circuits are respectively connected to a plurality of phase circuits of the motor and each include an upper bridge switch and a lower bridge switch; configuring a duty cycle command detector to generate a first protection start signal when a duty cycle corresponding to the input driving signal changes by more than a predetermined amount of change; and configuring a protection control circuit to receive the positive period indication signal, and output a forced disable signal in the positive period interval in response to receiving the first protection start signal to control the lower bridge switch of one phase of the inverter circuits to be turned off.

In certain embodiments, the motor driving method further includes: configuring a reverse current detecting circuit to output a second protection start signal when detecting a reverse current between the inverters and the phase circuits of the motor; and configuring the protection control circuit to output the forced disable signal in the positive period interval in response to receive the second protection start signal to control the lower bridge switch of one phase of the inverter circuits to be turned off.

In certain embodiments, the motor driving method further includes: configuring a first comparator of the reverse current detecting circuit to compare the reverse current with a reference current and output the second protection start signal in response to the reverse current being larger than the reference current.

In certain embodiments, the motor driving method further includes: configuring a counter of the protection control circuit to start timing when the forced disable signal is generated, and stop outputting the forced disable signal after a predetermined time.

In certain embodiments, the motor driving method further includes: configuring a sinusoidal wave modulator of the driving signal generating unit to receive the driving waveform pattern signal to generate a sinusoidal wave modulation signal; configuring a triangular wave generator of the driving signal generating unit to generate a triangular wave signal; and configuring a second comparator to receive the sinusoidal wave modulation signal and the triangular wave signal and perform a comparison operation to generate the control pulse signal.

In certain embodiments, the motor driving method further includes: configuring a switching circuit of the driving signal generating unit to switch an output of the driving signal generating unit from an output of the second comparator to a square wave driving circuit of the driving signal generating unit when receiving the first protection signal, and configuring the square wave driving circuit to generate a plurality of square wave driving signals corresponding to the phase circuits of the motor according to the input driving signal to control ON and OFF states of the phase circuits.

Therefore, the motor driving circuit and method provided by the present disclosure can prevent a reverse current from being generated when an output cycle or an input command is quickly switched, and can also adjust a triggering condition of the protection mechanism. In an application where the back electromotive force is large, a threshold of the triggering condition threshold can be lowered, and vice versa, the threshold can be increased to increase applicability.

In addition, the motor driving circuit and method provided by the present disclosure can further adjust a continuous protection time after triggering, and a time for triggering the continuous protection can be increased in the application that the back electromotive force is large by appropriately selecting the triggering condition, and conversely, the time for triggering the continuous protection can be decreased to increase applicability.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
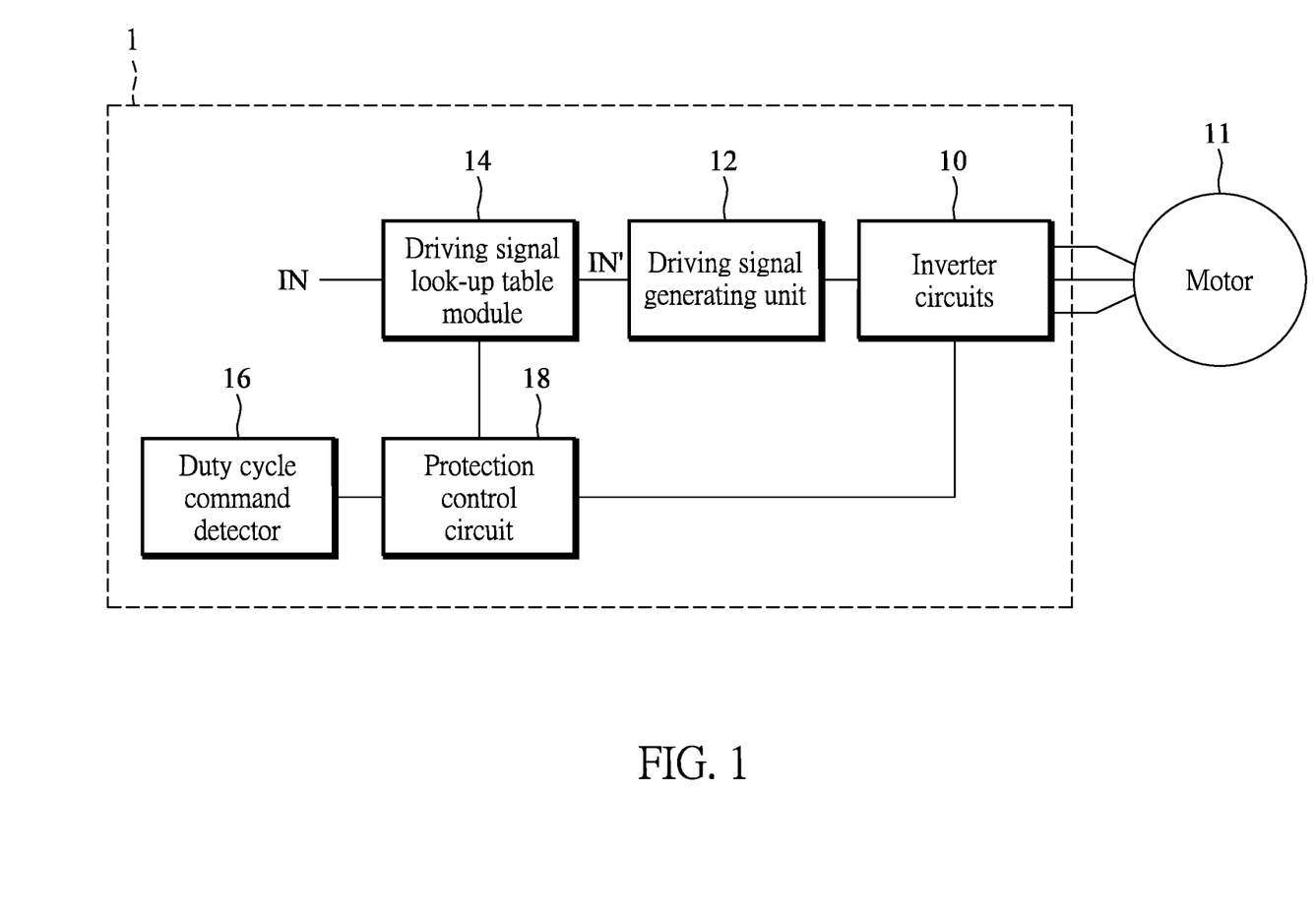
FIG. 1 is a circuit schematic diagram of a motor driving circuit of an embodiment of the present disclosure.

FIG. 1 is a circuit schematic diagram of a motor driving circuit of an embodiment of the present disclosure. Referring to FIG. 1, an embodiment of the present disclosure provides a motor driving circuit 1 for driving a motor 11, the motor driving circuit 1 includes a plurality of inverter circuits 10, a driving signal generating unit 12, a driving signal look-up table module 14, a duty cycle command detector 16 and a protection control circuit 18.

Figure 2:
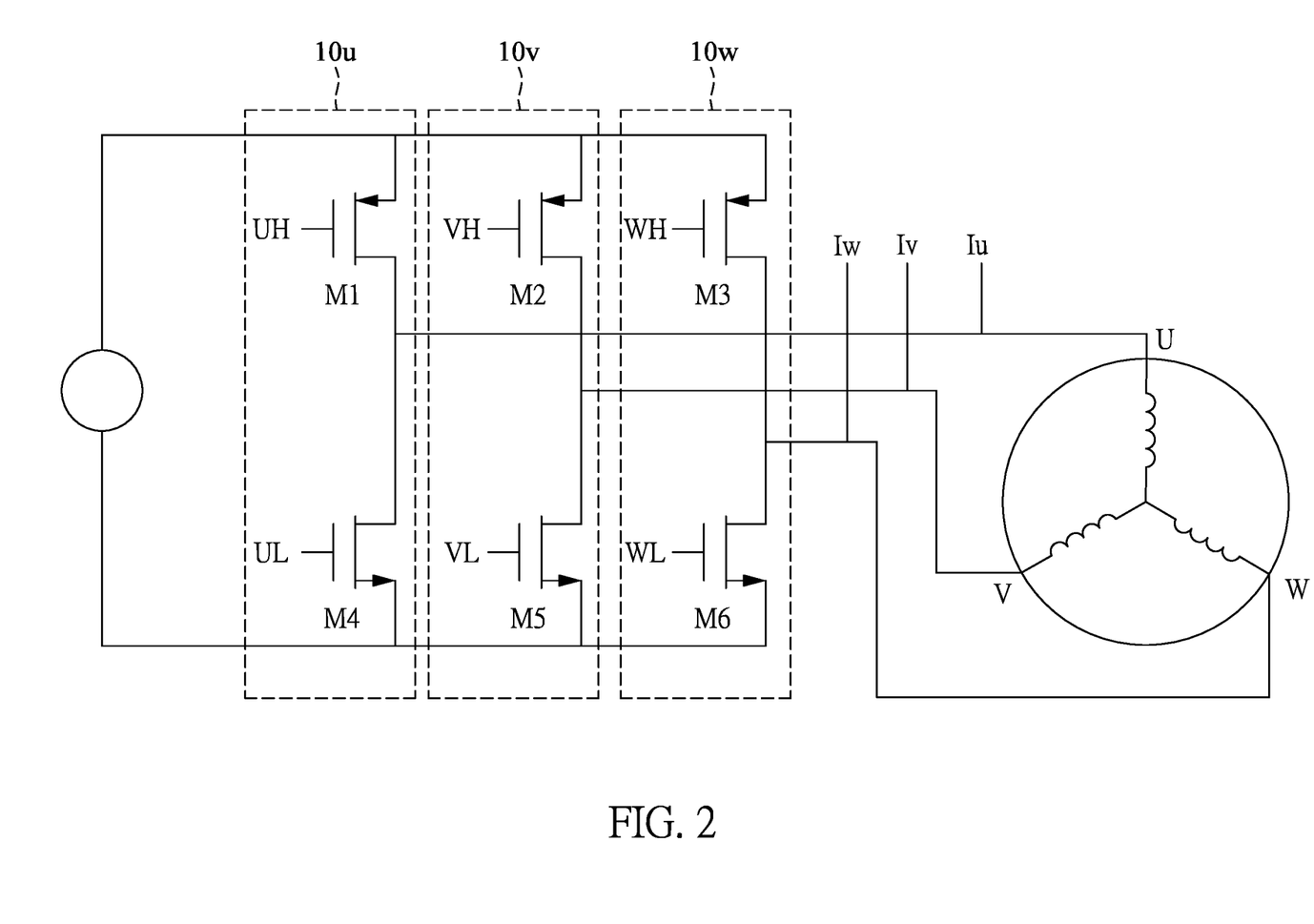
FIG. 2 is a circuit diagram of a motor and inverter circuits.

FIG. 2 is a circuit diagram of a motor and inverter circuits. Reference is made to FIG. 2, inverter circuits 10$u$, 10$v$, and 10$w$ are respectively connected to a plurality of phase circuits U, V, and W of the motor, and respectively include upper bridge switches M1, M2, M3 and lower bridge switches M4, M5, M6. The driving signal generating unit 12 receives input driving signals to output control pulse signals UH, UL, VH, VL, WH, and WL respectively, to control ON or OFF states of the respective switching units in the inverter circuit 10.

In general, the motor 11 has three windings, which are a U coil winding, a V coil winding, and a W coil winding. As seen from the circuit architecture of FIG. 2, the inverter circuit 10 includes the upper bridge switches M1, M2, M3 and the lower bridge switches M4, M5, and M6. When the upper bridge switch M1 and the lower bridge switch M5 are turned on, a current for driving the motor 11 flows from a power supply terminal, through the transistor M1, the U coil winding of the motor 11, the V coil winding, and then flows to a ground terminal through the transistor M5.

Generally, the currents for controlling a common motor flows from the U coil winding to the V coil winding, the U coil winding to the W coil winding, and a direction of the currents then changes as the currents flow from the V coil winding to the W coil winding, the V coil winding to the U coil winding, and then from the V coil winding to the W coil winding. Next, other phase changes continuously control a flow direction of the current of the U coil windings U, the V coil winding V, and the W coil winding W, thereby controlling a rotation direction of the motor. A phase change of the motor is described in the above embodiment, however, this is only one kind of motor phase changing control, other phase changing methods of the motor will not be described herein.

The driving signal look-up table module 14 is configured to perform a table lookup on an input driving signal IN to generate a driving waveform pattern signal IN' and simultaneously output a positive period indication signal for indicating a positive period interval of the input driving signal. The driving signal look-up table module 14 can be a database, a register, a memory, or other components having storage functions, and the present disclosure is not limited thereto.

In detail, the input signal IN may include a commutation signal obtained from a rotor position detector (e.g., a Hall sensor) or a commutation signal obtained by using a back electromotive force detection mechanism. On the other hand, the driving signal look-up table module 14 can be used to query built-in input driving signal pattern data for the input signal IN. For example, third-order harmonics or sine waves are used to generate a driving waveform pattern signal IN' to drive the motor 11, and the driving waveform pattern signal IN' sends corresponding waveform patterns according to the input signal IN, e.g., the commutation signal obtained by the rotor position detector or by the back electromotive force detecting mechanism.

Further, the driving signal generating unit 12 is configured to generate pulse-modulated control pulse signals UH, UL, VH, VL, WH, and WL in response to the driving waveform pattern signal IN' to control ON and OFF states of the inverter circuits 10$u$, 10$v$, and 10$w$.

The duty cycle command detector 16 is configured to generate a first protection start signal when a duty cycle corresponding to the input driving signal changes by more than a predetermined amount of change. For example, when a speed of the motor 11 is controlled by the input driving signal to be dropped, a back electromotive force generated by the motor in a high-speed operating state caused by inertia will generate a reverse current. The generated reverse current will flow back to a power supply terminal in a positive period while the lower bridge transistor switch is turned off, thereby causing a level of a voltage source potential to be raised and components to be damaged.

The protection control circuit 18 is configured to receive the positive period indication signal, and output a forced disable signal in a positive period interval in response to receive the first protection start signal to control the inverter circuits. For example, the lower bridge switch M4 of the inverter circuit 10$u$ can be turned off to prevent reverse currents from being generated, and damages of the components can be avoided.

Figure 3:
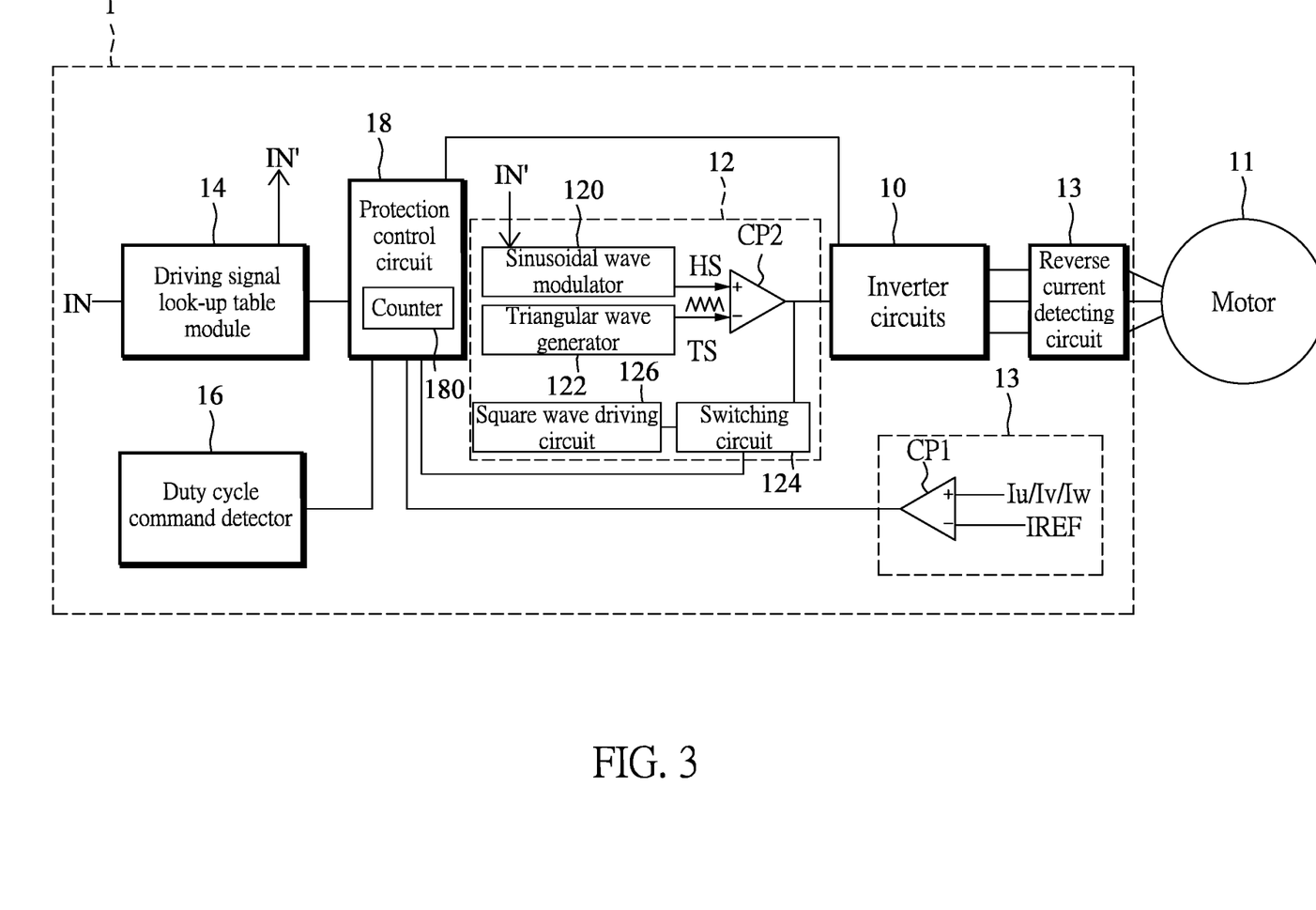
FIG. 3 is another circuit schematic diagram of a motor driving circuit of an embodiment of the present disclosure.

FIG. 3 is another circuit schematic diagram of a motor driving circuit of an embodiment of the present disclosure. In detail, the motor driving circuit 1 can include a reverse current detecting circuit 13 disposed between the inverter circuits 10 and the phase circuits of the motor 11, and the reverse current detecting circuit 13 is configured to output a second protection start signal when detecting a reverse current. The protection control circuit 18 is further configured to output the forced disable signal in the positive period interval in response to receive the second protection start signal to control the lower bridge switch of one phase of the inverter circuits 10 to be turned off.

In the present embodiment, the reverse current detecting circuit 13 further includes a first comparator CP1 configured to compare currents Iv, Iu, and Iw between the inverter circuits 10 and the phase circuit of the motor 11 with a reference current IREF. If the currents Iv, Iu, and Iw are greater than the reference current IREF, the second protection start signal is outputted.

In the present embodiment, the protection control circuit 18 includes a counter 180 configured to start timing when the forced disable signal is generated, and stop outputting the forced disable signal after a predetermined time T1.

Furthermore, the driving signal generating unit 12 includes a sinusoidal wave modulator 120, a triangular wave generator 122, and a second comparator CP2. The sinusoidal wave modulator 120 is configured to receive the driving waveform pattern signal IN' from the driving signal look-up table module 14 to generate a sinusoidal wave modulation signal HS, the triangular wave generator 122 is configured to generate a triangular wave signal TS, and the second comparator CP2 is configured to receive the sinusoidal wave modulation signal HS and the triangular wave signal TS and perform a comparison operation to generate the control pulse signals Pu/Pv/Pw.

Figure 4:
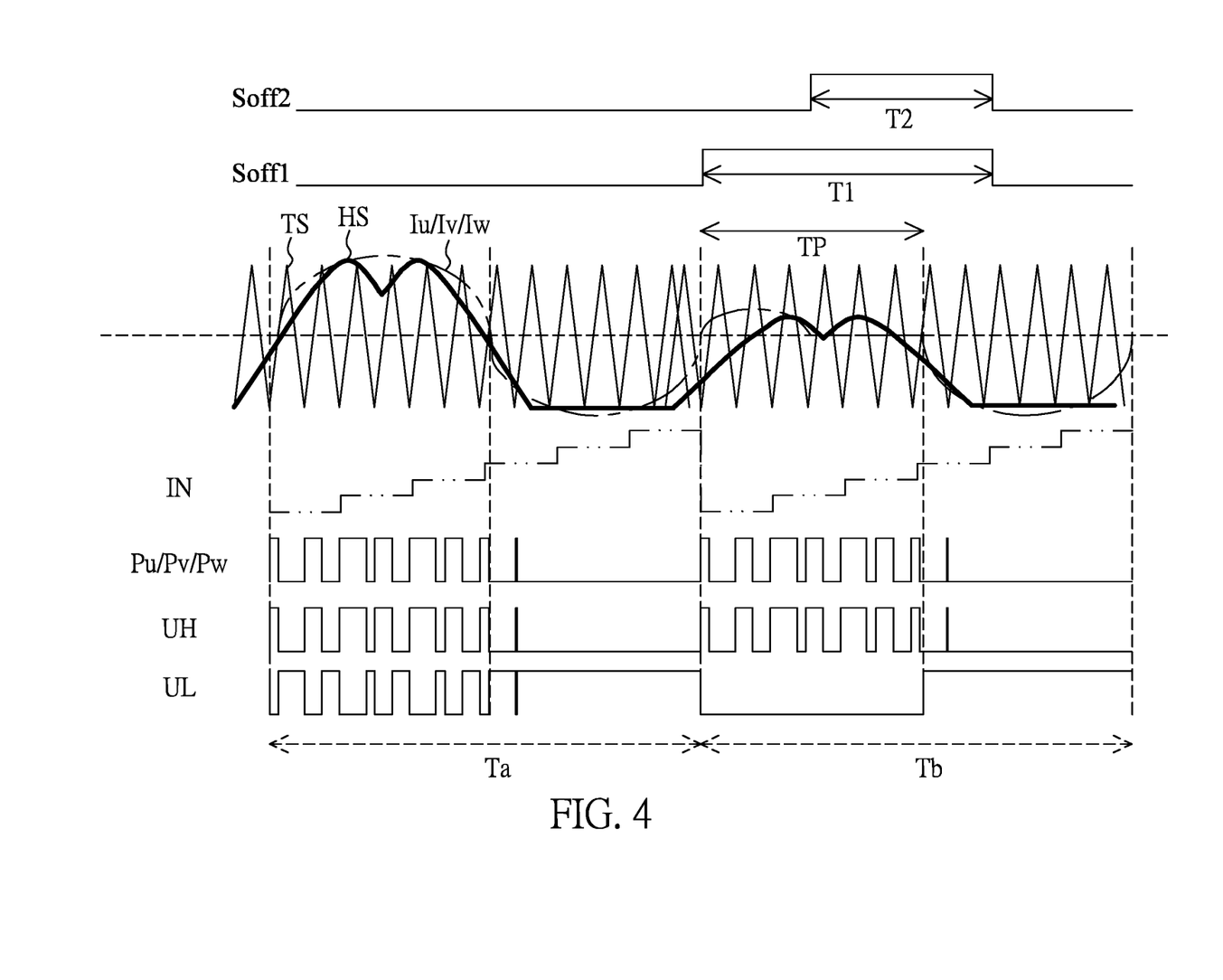
FIG. 4 is a signal timing diagram of a motor driving circuit according to an embodiment of the present disclosure.

Reference is made to FIG. 4, which is a signal timing diagram of a motor driving circuit according to an embodiment of the present disclosure. In a time interval Ta, the sinusoidal wave modulator 120 is configured to receive the driving waveform pattern signal IN' from the driving signal look-up table module 14 to generate a sinusoidal wave modulation signal HS, the triangular wave generator 122 is configured to generate a triangular wave signal TS, and the second comparator CP2 is configured to receive the sinusoidal wave modulation signal HS and the triangular wave signal TS and perform a comparison operation to generate the control pulse signals Pu/Pv/Pw. The control pulse signal Pu/Pv/Pw can be used as the control pulse signal UH, UL, VH, VL, WH, and WL, respectively, to control ON and OFF states of the inverter circuits $10u$, $10v$, and $10w$, and further control the operation of the motor 11.

When entering a time interval Tb, the input driving signal IN reduces the rotation speed of the motor 11 from 60% to 100%. For example, the signal look-up table module 14 is configured to perform a table look up on the input driving signal IN to output a positive period indication signal for indicating a positive period interval TP of a driving waveform pattern corresponding to the driving waveform pattern signal IN'. When the duty cycle command detector 16 detects that the duty cycle corresponding to the input driving signal IN changes by more than a predetermined amount of change, the duty cycle command detector 16 generates the first protection start signal, and output a forced disable signal Soff1 in the positive period interval TP in response to receive the first protection start signal to control the inverter circuits, e.g., turning off the lower bridge switch M4 of the inverter circuit $10u$, thereby preventing the reverse current from being generated and avoiding component damage. In an application that the back electromotive force is large, a threshold of the triggering condition threshold can be lowered, and vice versa, the threshold can be increased to increase applicability.

Moreover, the counter 180 starts counting when the forced disable signal Soff1 is generated, and stops outputting the forced disable signal Soff1 after the predetermined time T1. The user can adjust a continuous protection time after triggering, and a time for triggering the continuous protection can be increased in the application that the back electromotive force is large by appropriately selecting the triggering condition, and vice versa, the time for triggering the continuous protection can be decreased to increase applicability.

On the other hand, the currents Iv, Iu, and Iw between the inverter circuit 10 and the phase circuit of the motor 11 can be compared with the reference current IREF through the first comparator CP1 of the reverse current detecting circuit 13. If the currents Iv, Iu, and Iw are greater than the reference current IREF, the second protection start signal is outputted, and the protection control circuit 18 can output a forced disable signal Soff2 in the positive period interval TP to control the lower bridge switch of one phase of the inverter circuits 10 to be turned off in response to receive the second protection start signal. At this time, the counter 180 is configured to start timing when the forced disable signal Soff2 is generated, and stop outputting the forced disable signal Soff2 after a predetermined time T2.

Reference is further made to FIG. 3. The driving signal generating unit 12 further includes a switching circuit 124 and a square wave driving circuit 126. In this case, the switching circuit 124 is configured to switch an output of the driving signal generating unit 12 from an output of the second comparator to the square wave driving circuit 126 when receiving the first protection start signal, and the square wave driving circuit 126 can generate a plurality of square wave driving signals corresponding to the phase circuits U, V, and W of the motor according to the input driving signal IN to control ON and OFF states of the phase circuits U, V, and W.

Figure 5:
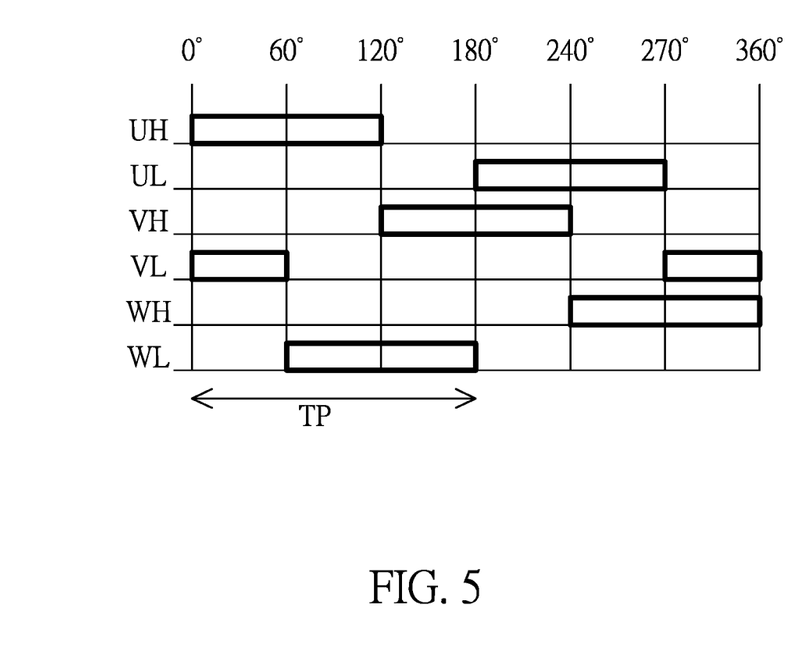
FIG. 5 is a schematic diagram of a six-step square wave control switching.

Reference is made to FIG. 5, which is a schematic diagram of a six-step square wave control switching. As shown in FIG. 5, taking the pulse signals UH and UL as an example, since the lower bridge switch M4 is controlled by the pulse signal UL, it can be seen that the lower bridge switch M4 is maintained in OFF state in the positive period interval TP, and similarly, the reverse current can be prevented from being generated, and component damage can be further avoided. Although the six-step square wave driving method results in large torque ripples, this method has low switching losses and does not require precise rotor position feedback.

Figure 6:
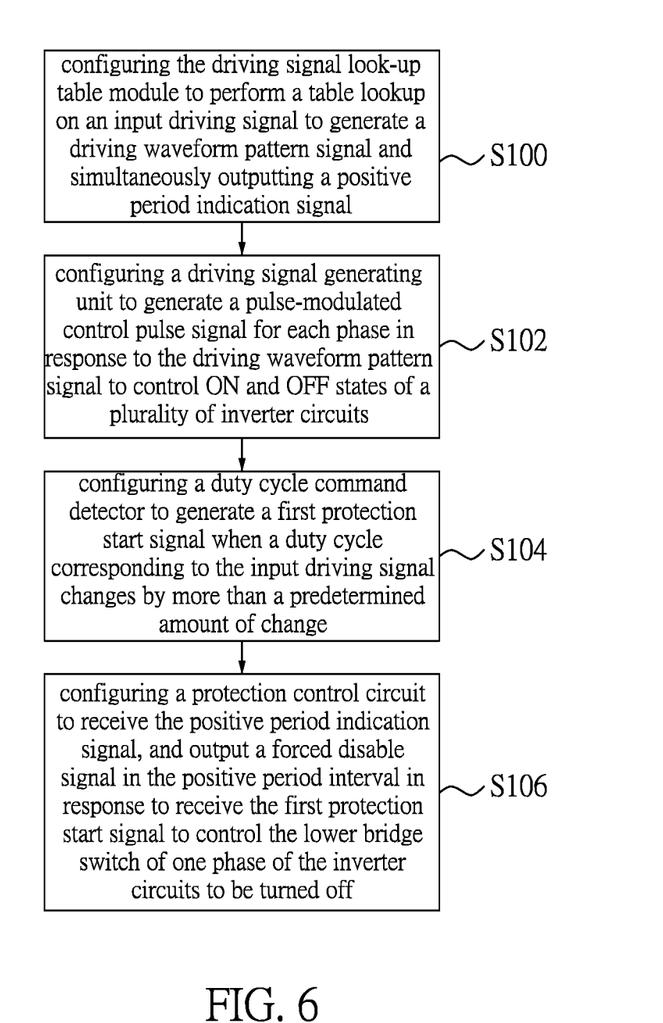
FIG. 6 is a flowchart of a motor driving method according to an embodiment of the present disclosure.

FIG. 6 is a flowchart of a motor driving method according to an embodiment of the present disclosure. Reference is made to FIG. 6, an embodiment of the present disclosure provides a motor driving method, which is applicable to the motor driving circuit 1 in the foregoing embodiments, and includes at least the following steps:

Step S100: configuring the driving signal look-up table module to perform a table lookup on an input driving signal to generate a driving waveform pattern signal and simultaneously outputting a positive period indication signal. The positive period indication signal is used to indicate a positive period interval of the input driving signal.

Step S102: configuring a driving signal generating unit to generate a pulse-modulated control pulse signal for each phase in response to the driving waveform pattern signal to control ON and OFF states of a plurality of inverter circuits. The plurality of inverter circuits are respectively connected to a plurality of phase circuits of the motor, and each includes an upper bridge switch and a lower bridge switch.

Step S104: configuring a duty cycle command detector to generate a first protection start signal when a duty cycle corresponding to the input driving signal changes by more than a predetermined amount of change.

Step S106: configuring a protection control circuit to receive the positive period indication signal, and output a forced disable signal in the positive period interval in response to receive the first protection start signal to control the lower bridge switch of one phase of the inverter circuits to be turned off.

The motor driving method of the present disclosure includes operation modes of the respective components of the motor driving circuit in the foregoing embodiments, and thus will not be described herein.

In conclusion, the motor driving circuit and method provided by the present disclosure can prevent a reverse current from being generated when an output cycle or an input command is quickly switched, and can also adjust a triggering condition of the protection mechanism. In an application that the back electromotive force is large, a threshold of the triggering condition threshold can be lowered, and vice versa, the threshold can be increased to increase applicability.

In addition, the motor driving circuit and method provided by the present disclosure can further adjust a continuous protection time after triggering, and the time for triggering the continuous protection can be increased in the application where the back electromotive force is large, by appropriately selecting the triggering condition, and vice versa, the time for triggering the continuous protection can be decreased to increase applicability.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit for driving a motor, comprising:
a plurality of inverter circuits respectively connected to a plurality of phase circuits of the motor, each including an upper bridge switch and a lower bridge switch;
a driving signal look-up table module configured to perform a table lookup on an input driving signal to generate a driving waveform pattern signal and simultaneously output a positive period indication signal for indicating a positive period interval of the input driving signal;
a driving signal generating unit configured to generate a pulse-modulated control pulse signal for each phase in response to the driving waveform pattern signal to control ON and OFF states of the inverter circuits;
a duty cycle command detector configured to generate a first protection start signal when a duty cycle corresponding to the input driving signal changes by more than a predetermined amount of change; and
a protection control circuit configured to receive the positive period indication signal, and output a forced disable signal in the positive period interval in response to receive the first protection start signal to control the lower bridge switch of one phase of the inverter circuits to be turned off.

2. The motor driving circuit according to claim 1, further comprising a reverse current detecting circuit disposed between the inverter circuits and the phase circuits of the motor, and configured to output a second protection start protection signal when detecting a reverse current, wherein the protection control circuit is further configured to output the forced disable signal in the positive period interval in response to receive the second protection start signal to control the lower bridge switch of one phase of the inverter circuits to be turned off.

3. The motor driving circuit according to claim 2, wherein the reverse current detecting circuit further includes a first comparator configured to compare the reverse current with a reference current, and output the second protection start signal in response to the reverse current being larger than the reference current.

4. The motor driving circuit according to claim 1, wherein the protection control circuit includes a counter configured to start timing when the forced disable signal is generated, and stop outputting the forced disable signal after a predetermined time.

5. The motor driving circuit according to claim 1, wherein the driving signal generating unit includes:
a sinusoidal wave modulator configured to receive the driving waveform pattern signal to generate a sinusoidal wave modulation signal;
a triangular wave generator configured to generate a triangular wave signal; and
a second comparator configured to receive the sinusoidal wave modulation signal and the triangular wave signal and perform a comparison operation to generate the control pulse signal.

6. The motor driving circuit according to claim 5, wherein the driving signal generating unit further includes a switching circuit and a square wave driving circuit, the switching circuit is configured to switch an output of the driving signal generating unit from an output of the second comparator to the square wave driving circuit when receiving the first protection signal, and the square wave driving circuit generates a plurality of square wave driving signals corresponding to the phase circuits of the motor according the input driving signal to control ON and OFF states of the phase circuits.

7. A motor driving method, comprising the following steps:
configuring a driving signal look-up table module to perform a table lookup on an input driving signal to generate a driving waveform pattern signal and simultaneously output a positive period indication signal for indicating a positive period interval of the input driving signal;
configuring a driving signal generating unit to generate a pulse-modulated control pulse signal for each phase in response to the driving waveform pattern signal to control ON and OFF states of a plurality of inverter circuits, wherein the plurality of inverter circuits are respectively connected to a plurality of phase circuits of the motor and each include an upper bridge switch and a lower bridge switch;
configuring a duty cycle command detector to generate a first protection start signal when a duty cycle corresponding to the input driving signal changes by more than a predetermined amount of change; and
configuring a protection control circuit to receive the positive period indication signal, and output a forced disable signal in the positive period interval in response to receiving the first protection start signal to control the lower bridge switch of one phase of the inverter circuits to be turned off.

8. The motor driving method of claim 7, further comprising:
configuring a reverse current detecting circuit to output a second start protection signal when detecting a reverse current between the inverters and the phase circuits of the motor; and
configuring the protection control circuit to output the forced disable signal in the positive period interval in response to receiving the second protection start signal to control the lower bridge switch of one phase of the inverter circuits to be turned off.

9. The motor driving method according to claim 8, further comprising:

configuring a first comparator of the reverse current detecting circuit to compare the reverse current with a reference current and output the second protection start signal in response to the reverse current being larger than the reference current.

10. The motor driving method according to claim 7, further comprising:

configuring a counter of the protection control circuit to start timing when the forced disable signal is generated, and stop outputting the forced disable signal after a predetermined time.

11. The motor driving method according to claim 7, further comprising:

configuring a sinusoidal wave modulator of the driving signal generating unit to receive the driving waveform pattern signal to generate a sinusoidal wave modulation signal;

configuring a triangular wave generator of the driving signal generating unit to generate a triangular wave signal; and configuring a second comparator to receive the sinusoidal wave modulation signal and the triangular wave signal and perform a comparison operation to generate the control pulse signal.

12. The motor driving method according to claim 11, further comprising:

configuring a switching circuit of the driving signal generating unit to switch an output of the driving signal generating unit from an output of the second comparator to a square wave driving circuit of the driving signal generating unit when receiving the first protection signal, and configuring the square wave driving circuit to generate a plurality of square wave driving signals corresponding to the phase circuits of the motor according to the input driving signal to control ON and OFF states of the phase circuits.

* * * * *